United States Patent [19]

Barthorpe

[11] Patent Number: 4,995,982
[45] Date of Patent: Feb. 26, 1991

[54] PROCESS FOR RECOVERING AND PURIFYING A HIGH MOLECULAR WEIGHT SULFONATE

[75] Inventor: Richard T. Barthorpe, Littleton, Colo.

[73] Assignee: Marathon Oil Company, Findlay, Ohio

[21] Appl. No.: 430,849

[22] Filed: Nov. 1, 1989

[51] Int. Cl.$^5$ .............................................. B01D 11/04
[52] U.S. Cl. .................................... 210/634; 528/493; 528/494; 528/496
[58] Field of Search ................. 210/634, 729; 528/493, 528/496, 494

[56] References Cited

U.S. PATENT DOCUMENTS 4,065,414 12/1977 Selta et al. ......................... 260/17 R
4,359,555 11/1982 d'Hondt et al. ...................... 525/358
4,361,658 11/1982 Lundberg et al. ................... 524/916
4,412,028 10/1983 Lundberg et al. ................... 525/387

FOREIGN PATENT DOCUMENTS 1495761 2/1970 Fed. Rep. of Germany .

OTHER PUBLICATIONS

Encyclopedia of Polymer Science and Technology, vol. 6, 1967, pp. 458, 459 and 461.

Primary Examiner—Frank Spear
Assistant Examiner—Krisanne Shideler
Attorney, Agent, or Firm—Jack L. Hummel; Jack E. Ebel

[57] ABSTRACT

A process for separating a relatively high molecular polymeric sulfonate, such as a polyvinyl sulfonate, from undesirable by-products of solfonation. An aqueous solution having a polymeric sulfonate dissolved therein is contacted with from about 7.5 to about 40 volume percent of a solvent selected from methanol, ethanol, acetone, or dipropylene glycol monomethyl ether to remove undesirable by-products of sulfonation therefrom and to enhance the molecular weight of the polymeric sulfonate.

14 Claims, 2 Drawing Sheets

PROCESS FOR RECOVERING AND PURIFYING A HIGH MOLECULAR WEIGHT SULFONATE

BACKGROUND OF THE INVENTION

The present invention relates to a process for recovering form an aqueous polymerization solution a relatively high molecular weight polymeric sulfonate, such as polyvinyl sulfonate, which is substantially free of undesirable by-products of sulfonation, and more particularly, to such a process wherein the molecular weight of the polymeric sulfonate, such as polyvinyl sulfonate, which is recovered is increased.

Polymeric sulfonates are conventionally polymerized form commercially available solutions containing a monomer in the presence of a suitable catalyst. For example, polyvinyl sulfonate can be polymerized from a commercially available, dilute, e.g. 25-50 weight percent, aqueous solution of vinylsulfonic acid, sodium salt, in the presence of a suitable catalyst, such as ammonium persulfate or sodium bisulfite. The resultant aqueous polymerization solution contains undesirable by-products of sulfonation, such as sulfate ions and hydroxyethyl sulfonate, and unreacted vinylsulfonic acid, sodium salt monomer, in addition to polyvinyl sulfonate. The presence of such undesirable by-products can be extremely deleterious when polyvinyl sulfonate is used as a scale inhibitor. Addition of large quantities of methanol to an aqueous polymerization solution has been advanced to separate polymeric sulfonates, such as polyvinyl sulfonate, therefrom. However, large quantities of methanol will precipitate polymeric sulfonates and unwanted by-products of sulfonation from the solution. Thus, a need exists for a process for separating polymeric sulfonates, such as polyvinyl sulfonate, from an aqueous polymerization solution also containing unwanted by-products of sulfonation.

Accordingly, it is an object of the present invention to provide a process for recovering and purifying a relatively high molecular weight polymeric sulfonate, such as a polyvinyl sulfonate, by selectively separating unwanted by-products of sulfonation, such as sulfate ions and hydroxyethyl sulfonate, from aqueous solutions containing the polymeric sulfonate.

It is a further object of the present invention to provide a process for enhancing the molecular weight of a relatively high molecular weight polymeric sulfonate, such as a polyvinyl sulfonate.

SUMMARY OF THE INVENTION

The present invention provides a process for separating a relatively high molecular weight polymeric sulfonate, such as a polyvinyl sulfonate, from undesirable by-products of sulfonation and for increasing the molecular weight of a relatively high molecular weight polymeric sulfonate, such as a polyvinyl sulfonate. An initial aqueous solution having a polymeric sulfonate, such as a polyvinyl sulfonate, dissolved therein is contacted with from about 7.5 to about 40 volume percent of a solvent selected form methanol, ethanol, acetone, or dipropylene glycol monomethyl ether and forms two distinct phases. The lower phase is separated and water is added thereto to obtain a volume approximately equal to the volume of the initial aqueous solution. Thereafter, the previously selected solvent is added to the separated lower phase in an amount of from about 7.5 to about 40 volume percent of the initial aqueous solution. Two distinct phases are again formed. The resultant lower phase comprises at least 70 weight percent of the polymeric sulfonate, such as a polyvinyl sulfonate, while at least 70 weight percent of the undesirable by-products of sulfonation are removed therefrom.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE PREFERRED EMBODIMENTS

Figure 1:
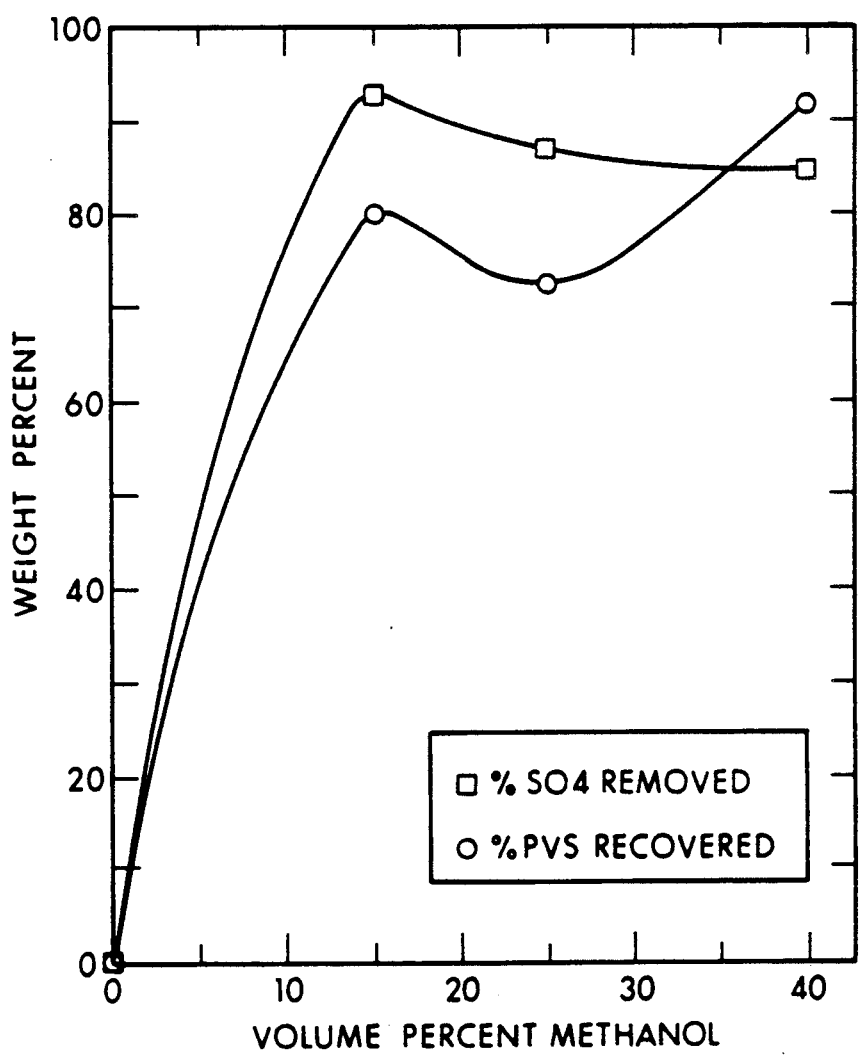
FIG. 1 is a graph illustrating the weight percent of polyvinyl sulfonate recovered and the weight percent of sulfate ions removed as a function of the volume percent of methanol added to separated lower phases.

The present invention relates to a process for selectively separating undesirable by-products of sulfonation, such as sulfate ions and hydroxyethyl sulfonate, from an aqueous solution containing a polymeric sulfonate, such as a polyvinyl sulfonate, and to a process which increases the molecular weight of a relatively high molecular weight polymeric sulfonate, such as polyvinyl sulfonate. As utilized throughout this specification, the term 'molecular weight' refers to the weight average molecular weight which is determined from experiments in which each molecule or chain makes a contribution to the measured result. The weight average molecular weights reported in this specification were determined using a size exclusion chromatographic determination of molecular weights which employed a column packed with a polymeric gel. As also utilized throughout this specification, the term "water" refers to preferably fresh water, i.e. water having less than about 1,000 ppm total dissolved solids or to a low salinity brine.

In accordance with the present invention, an aqueous reaction solution having a polymeric sulfonate, for example polyvinyl sulfonate, unreacted monomer, for example sodium vinyl sulfonate monomer, and unwanted by-products of sulfonation dissolved therein is first contacted with a solvent selected from methanol, ethanol, acetone, or dipropylene glycol monomethyl ether by adding the solvent to the aqueous solution. The solvent is added to the aqueous solution in an amount of from about 7.5 volume percent to about 40 volume percent, more preferably from about 10 volume percent to about 25 volume percent, and most preferably from about 15 volume percent to about 25 volume percent. The aqueous solution separates into two distinct phases. An upper phase comprises solvent, a portion of the undesirable by-products of sulfonation, lower molecular weight components of the polyvinyl sulfonate, and unreacted sodium vinyl sulfonate monomer. A lower phase comprises water, polyvinyl sulfonate, and a portion of undesirable by-products of sulfonation. In accordance with the present invention, the lower phase is separated from the upper phase by any suitable means as will be evident to the skilled artisan. Water is then added to the lower phase in an amount sufficient to increase the volume of the lower phase to the original volume of the aqueous solution. Thereafter, the solvent selected for the initial separation stage is added to the lower phase in a like amount of from about 7.5 volume percent to about 40 volume percent, more preferably from about 10 volume percent to about 25 volume percent, and most preferably from about 15 volume percent to about 25 volume percent to form a distinct upper and lower phase. Once again, the upper phase comprises solvent, a portion of the undesirable by-products of sulfonation, lower molecular weight components of the polyvinyl sulfonate, and unreacted sodium vinyl sulfonate monomer. The lower aqueous phase comprises at least 70 weight percent of the polyvinyl sulfonate while at least about 70 weight percent of the undesirable by-products of sulfonation are removed from the lower phase during the separation process of the present invention. The resultant polyvinyl sulfonate containing aqueous solution can be utilized as a scale inhibitor as described in commonly assigned, co-pending patent application entitled "Polyvinyl Sulfonate Scale Inhibitor" to David O. Falk et al. which was filed concurrently herewith.

While it is preferred to add substantially identical amounts of solvent in the two separation stages of the present invention, the amount of solvent added in the second separation stage can vary by up to about 10 volume percent form the amount of solvent added in the initial separation stage without departing from the scope of the present invention.

The following examples demonstrate the practice and utility of the present invention but are not to be construed as limiting the scope thereof.

EXAMPLE 1

3.75 ml of methanol (15 vol %) are added to 25 ml of an aqueous solution containing 25 wt % of a polyvinyl sulfonate having a molecular weight of about 18,902 in a separating funnel. Two phases are formed and the lower phase is separated form the upper phase through a valve at the bottom of the separating funnel. Enough water is added to the lower phase in a separating funnel to obtain a total volume of 25 ml. 3.75 ml (15 vol %) of methanol is added to the resultant solution. A phase interface is established in approximately 1 minute. After 30 minutes the phases have separated and the lower phase is removed through a valve at the bottom of the separating funnel. A sample of each upper separated phase is analyzed by high pressure liquid chromatography, and it is calculated that the lower phase retains 80 wt % of the polyvinyl sulfonate while 93 wt % of sulfate ions present in the initial solution are removed.

50 ml of an aqueous solution containing 25 wt % of a polyvinyl sulfonate having a molecular weight of about 18,902 is treated by the process of the present invention as set forth about except that 20 ml (40 vol %) of methanol is added to the solution at each of the two separation stages set forth above. This procedure results in 92 wt % of the polyvinyl sulfonate being retained in solution while 84.3 wt % of the sulfate ions are removed therefrom.

The process of the present invention as set forth above was repeated on an aqueous solution containing 25 wt % of a polyvinyl sulfonate having a molecular weight of about 18,902 except that approximately 25 vol % methanol was added to the aqueous solution containing polyvinyl sulfonate at each separation stage, and the solution was allowed to separate into two phases for approximately 1 hour after each such addition. This procedure results in an aqueous solution of polyvinyl sulfonate in which 72 wt % of the polyvinyl sulfonate is recovered while 87 wt % of the sulfate ions are removed therefrom. The results of such analysis are depicted in FIG. 1.

EXAMPLE 2

Figure 2:
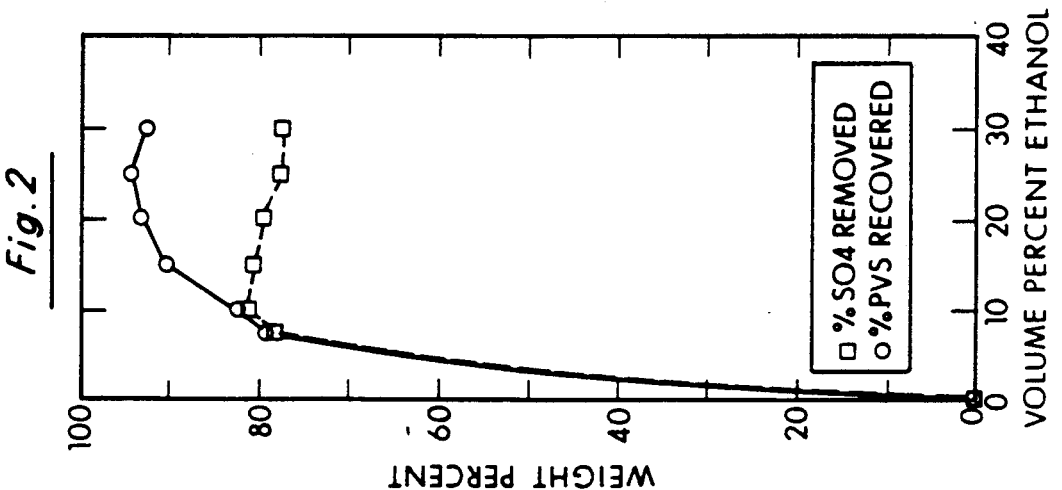
FIG. 2 is a graph illustrating the weight percent of polyvinyl sulfonate recovered and the weight percent of sulfate ions removed as a function of the volume percent of ethanol added to separated lower phases.

Various volume percents of ethanol are each added to separate graduated cylinders containing 10 ml of an aqueous solution containing 25 wt % of a polyvinyl sulfonate having a molecular weight of about 18,902. Each resultant solution is allowed to separate into an upper and lower phase for about 2 hours, and each upper phase is separated with a graduated syringe having a 1/16 inch stainless steel tube. Water is added to each remaining lower phase to obtain 10 ml total volume and varying volume percentages of ethanol which are identical to those previously added are each added to the respective graduated cylinders. Each resultant solution is allowed to separate into two phases for approximately 2 hours and each resultant upper phase is separated with a graduated syringe. Each remaining lower phase is diluted to 10 ml total volume upon the addition of water and is analyzed by high pressure liquid chromatography. The results of such analysis are depicted in FIG. 2.

EXAMPLE 3

Figure 3:
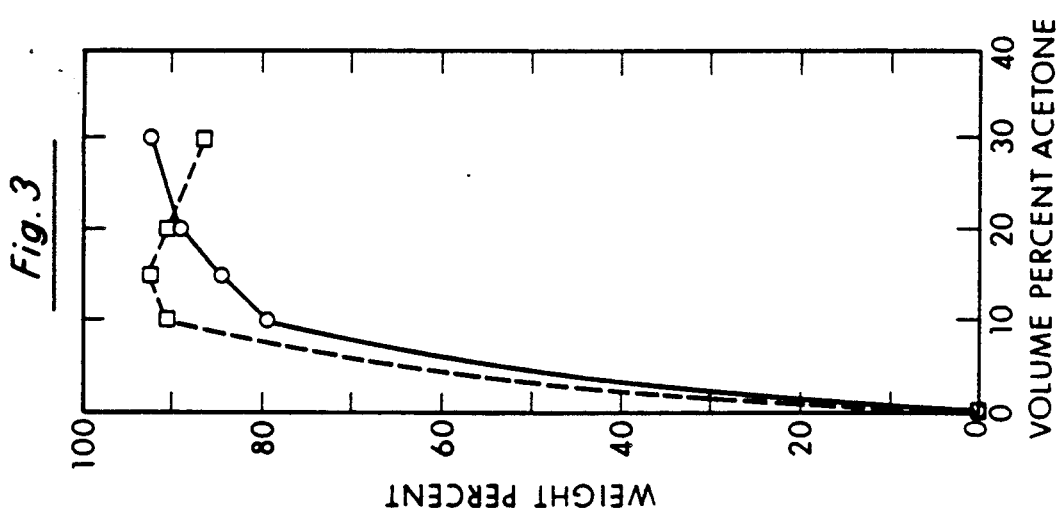
FIG. 3 is a graph illustrating the weight percent of polyvinyl sulfonate recovered and the weight percent of sulfate ions removed as a function of the volume percent of acetone added to separated lower phases.

Various volume percents of acetone are each added to separate graduated cylinders containing 10 ml of an aqueous solution containing 25 wt % of a polyvinyl sulfonate having a molecular weight of about 18,902. Each resultant solution is allowed to separate into upper and lower phases for about 2 hours, and each upper phase is separated with a graduated syringe having a 1/16 inch stainless steel tube. Water is added to each remaining lower phase to obtain a 10 ml total volume and varying volume percentages of acetone which are identical to those previously added are each added to the separate graduated cylinders. Each resultant solution is allowed to separate into two phases for approximately 2 hours and each upper phase is separated with a graduated syringe. Each remaining lower phase is diluted to 10 ml total volume upon the addition of water and is analyzed by high pressure liquid chromatography. The results of such analysis are depicted in FIG. 3.

EXAMPLE 4

Figure 4:
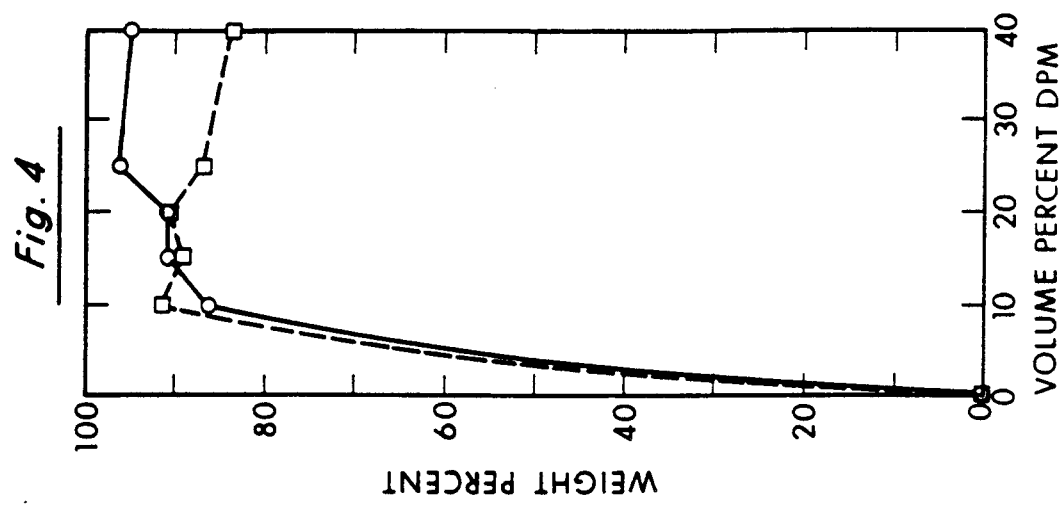
FIG. 4 is a graph illustrating the weight percent of polyvinyl sulfonate recovered and the weight percent of sulfate ions removed as a function of the volume percent of dipropylene glycol monomethyl ether added to separated lower phases.

Various volume percents of dipropylene glycol monomethyl ether are each added to separate graduated cylinders containing 10 ml of an aqueous solution containing 25 wt % of a polyvinyl sulfonate having a molecular weight of about 12,191. Each resultant solution is allowed to separate into an upper and lower phase for about 2 hours, and each upper phase is separated with a graduated syringe having a 1/16 each stainless steel tube. Water is added to each remaining lower phase to obtain a 10 ml total volume and varying volume percentages of dipropylene glycol monomethyl ether which are identical to those previously added are each added to the separate graduated cylinders. Each resultant solution is allowed to separate into two phases for approximately 2 hours and each upper phase is separated with a graduated syringe. Each remaining lower phase is diluted to 10 ml total volume upon the addition of water and is analyzed bay high pressure liquid chromatography. The results of such analysis are depicted in FIG. 4.

As indicated by the results of Examples 1-4, the two-stage separation process of the present invention results in greater than 70 wt % of the polyvinyl sulfonate being retained in solution while greater than 70 wt % of the undesirable by-products of sulfonation, e.g. sulfate ions, are removed from solution. In accordance with the process of the present invention a solvent of methanol, ethanol, acetone, or dipropylene glycol monomethyl ether is added to an aqueous solution having a polyvinyl sulfonate dissolved therein in an amount of from about 10 to about 80 vol % of the total volume of the solution to which the solvent is added. Above about 80 vol %, the cost of solvent and the problem in disposing of the solvent render the use of solvent uneconomical and undesirable. While methanol is the least expensive of the solvents suitable for use in the process of the present invention, methanol is also the most toxic and flammable of the solvents listed. And although dipropylene glycol monomethyl ether is the most expensive, it is non-flammable and is relatively non-toxic.

EXAMPLE 5

The procedure set forth first in Example 1 is repeated utilizing the addition of 25 vol % of methanol. The molecular weight of the polyvinyl sulfonate dissolved in the initial aqueous solution, the polyvinyl sulfonate in each separated upper phase, and the molecular weight of the polyvinyl sulfonate in the resultant aqueous solution are analyzed. The molecular weight of the initial polyvinyl sulfonate is determined to be about 12,191. The molecular weight of the polyvinyl sulfonate in the upper phase resulting from the first stage of the separation process of the present invention is determined to be about 4,855. The molecular weight of the polyvinyl sulfonate in the upper phase of the second stage of the separation process of the present invention is determined to be about 5,189. the molecular weight of the polyvinyl sulfonate in the solution obtained utilizing the process of the present invention is determined to be about 15,049.

As indicated by the results of Example 5, the process of the present invention increases the molecular weight of polyvinyl sulfonate by removing lower molecular weight components of polyvinyl sulfonate during each separation stage. In general, the process of the present invention removes molecular weight components having a molecular weight less than about 5,000. Therefore, the largest increase in molecular weight will be obtained when the process of the present invention is utilized to separate lower molecular weight fractions from polyvinyl sulfonate having a molecular weight greater than 10,000.

Throughout the description, the process of the present invention has been characterized as suitable for recovering, purifying, and enhancing the molecular weight of a polymeric sulfonate, such as a polyvinyl sulfonate. As will be evident to those skilled in the art, the process of the present invention is equally applicable to recover, purify, and enhance the molecular weight of copolymers of polyvinyl sulfonates as well as other polymeric sulfonates, such as polystyrene sulfonate and copolymers thereof and 2-acrylamide, 2-methylpropane sulfonic acid and copolymers thereof.

While the foregoing preferred embodiments of the invention have been described and shown, it is understood that the alternatives and modifications, such as those suggested and others, may be made thereto and fall within the scope of the invention.

I claim:

1. A process for recovering and purifying a polymeric sulfonate containing aqueous solution consisting essentially of:
   (a) adding to an aqueous solution having a polymeric sulfonate and deleterious by-products of sulfonation dissolved therein a solfonate selected from methanol, ethanol, acetone or dipropylene glycol monomethyl ether, in a first amount of from about 7.5 to about 40 volume percent of said aqueous solution, said aqueous solution to which said solvent has been added in said first amount forming a first upper phase and a first lower aqueous phase;
   (b) separating said first upper phase from said first lower aqueous phase;
   (c) adding water to said first lower aqueous phase in an amount sufficient to obtain a volume of said first lower aqueous phase which is approximately equal to the volume of said aqueous solution;
   (d) adding said solvent to said first lower aqueous phase in a second amount of from about 7.5 to about 40 volume percent of the volume of said aqueous solution thereby forming a second upper phase and a second lower aqueous phase; and
   (e) separating said second lower aqueous phase from said second upper phase, said second lower aqueous phase having a majority of said polymeric sulfonate dissolved therein while said first and said second upper phases having a majority of said deleterious by-products of sulfonation dissolved therein.

2. The process of claim 1 wherein said polymeric sulfonate is a polyvinyl sulfonate.

3. The process of claim 2 wherein at least 70 weight percent of said polyvinyl sulfonate is dissolved in said second lower aqueous phase.

4. The process of claim 1 wherein at least 70 weight percent of said deleterious by-products of sulfonation are dissolved in said first and said second upper phases.

5. The process of claim 1 wherein said first and said second amounts are from about 10 to about 25 volume percent.

6. The process of claim 5 wherein said first and said second amounts are from about 15 to about 25 volume percent.

7. The process of claim 1 wherein said second amount is substantially equal to said first amount.

8. The process of claim 1 wherein said aqueous solution further has unreacted sulfonate monomer dissolved therein and said first and said second upper phases have a portion of said unreacted sulfonate monomer dissolved therein.

9. A process for enhancing the molecular weight of a polymeric sulfonate which is contained in an aqueous solution consisting essentially of:
   (a) adding to an aqueous solution having a polymeric sulfonate dissolved therein a solvent selected from methanol, ethanol, acetone or dipropylene glycol monomethyl ether in a first amount of from about 7.5 to about 40 volume percent of said solution thereby forming a first upper phase and a first lower aqueous phase, said polymeric sulfonate having a first molecular weight;

(b) separating said first lower aqueous phase from said first upper phase;

(c) adding water to said first lower aqueous phase in an amount sufficient to obtain a volume of said first lower aqueous phase approximately equal to the volume of said aqueous solution;

(d) adding said solvent to said first lower aqueous phase in a second amount of from about 7.5 to about 40 volume percent of the volume of said aqueous solution thereby forming a second upper phase and a second lower aqueous phase; and (e) separating said second lower aqueous phase from said second upper phase, said second lower aqueous phase having a majority of said polymeric sulfonate dissolved therein, said majority of said polymeric sulfonate having a second molecular weight which is greater than said first molecular weight.

10. The process of claim 9 wherein said polymeric sulfonate is a polyvinyl sulfonate.

11. The process of claim 10 wherein said polyvinyl sulfonate has a first or second molecular weight greater than 10,000.

12. The process of claim 9 wherein said first and said second amounts are from about 10 to about 25 volume percent.

13. The process of claim 12 wherein said first and said second amounts are from about 15 to about 25 volume percent.

14. The process of claim 9 wherein said second amount is substantially equal to said first amount.

* * * * *

UNITED STATES PATENT AND TRADEMARK OFFICE
CERTIFICATE OF CORRECTION

PATENT NO. : 4,995,982

DATED : February 26, 1991

INVENTOR(S) : Richard T. Barthorpe

It is certified that error appears in the above-identified patent and that said Letters Patent is hereby corrected as shown below:

| | |
|---|---|
| Abstract, line 3: | Delete "solfonation" and insert therefor --sulfonation--. |
| Col. 1, line 7: | Delete "form" and insert therefor --from--. |
| Col. 1, line 15: | Delete "form" and insert therefor --from--. |
| Col. 1, line 60: | Delete "form" and insert therefor --from--. |
| Col. 3, line 37: | Delete "form" and insert therefor --from--. |
| Col. 3, line 49: | Delete "form" and insert therefor --from--. |
| Col. 5, line 47: | Delete "the" before "molecular" and insert therefor --The--. |
| Col. 6, line 17: | Delete "solfonate" and insert therefor --solvent--. |

Signed and Sealed this

Eleventh Day of August, 1992

*Attest:*

DOUGLAS B. COMER

*Attesting Officer*   *Acting Commissioner of Patents and Trademarks*